US012033469B2

(12) United States Patent
Walsh et al.

(10) Patent No.: US 12,033,469 B2
(45) **Date of Patent: *Jul. 9, 2024**

(54) SYSTEMS AND METHODS FOR INCREMENTALLY INCREASING A TIERED PLURALITY OF PROGRESSIVE JACKPOTS

(71) Applicant: Aristocrat Technologies Australia Pty Limited, North Ryde (AU)

(72) Inventors: Kevin Walsh, Reno, NV (US); Michael P. Casey, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 133 days.

This patent is subject to a terminal disclaimer.

(21) Appl. No.: 17/374,889

(22) Filed: Jul. 13, 2021

(65) Prior Publication Data

US 2021/0343117 A1 Nov. 4, 2021

Related U.S. Application Data

(63) Continuation of application No. 16/679,779, filed on Nov. 11, 2019, now Pat. No. 11,080,965, which is a (Continued)

(51) Int. Cl.
*G07F 17/32* (2006.01)

(52) U.S. Cl.
CPC ...... *G07F 17/3258* (2013.01); *G07F 17/3223* (2013.01)

(58) Field of Classification Search
CPC ............. G07F 17/3258; G07F 17/3225; G07F 17/3244; G07F 17/3223

(Continued)

(56) References Cited

U.S. PATENT DOCUMENTS 6,113,102 A 9/2000 Marks
9,378,620 B2 * 6/2016 Soong ................. G07F 17/3258

(Continued)

FOREIGN PATENT DOCUMENTS

AU 2007216941 B1 * 10/2008 ............. G07F 17/32

OTHER PUBLICATIONS

U.S. Appl. No. 15/658,159, filed Jul. 24, 2017 entitled A Gaming Machine.

(Continued)

*Primary Examiner* — Michael A Cuff
(74) *Attorney, Agent, or Firm* — Armstrong Teasdale LLP

(57) ABSTRACT

An electronic gaming system includes a progressive system server configured to establish a tiered plurality of progressive jackpots that includes a first jackpot increasable a first cap value, a second jackpot increasable to a second cap value greater than the first cap value, and at least one intermediate jackpot increasable to at least one intermediate cap value greater than the first cap value and less than the second cap value. The progressive system server is further configured to allocate portions of player wagers to one of i) the first jackpot, ii) the at least one intermediate jackpot, and iii) the second jackpot, whereby the first jackpot is initially incrementally increased to the first cap value, the at least one intermediate jackpot is next incrementally increased to the at least one intermediate cap value, and the second jackpot is next incrementally increased to the second cap value.

20 Claims, 11 Drawing Sheets

Related U.S. Application Data continuation of application No. 16/057,965, filed on Aug. 8, 2018, now Pat. No. 10,733,843.

(58) Field of Classification Search
USPC .......................................................... 463/26, 27
See application file for complete search history.

(56) References Cited

U.S. PATENT DOCUMENTS

| | | | |
|---|---|---|---|
| 2002/0027323 | A1 | 3/2002 | Vancura |
| 2005/0239542 | A1 | 10/2005 | Olsen |
| 2007/0060314 | A1 | 3/2007 | Baerlocher |
| 2009/0247267 | A1 | 10/2009 | Acres |
| 2010/0120523 | A1 | 5/2010 | Chim |
| 2011/0111828 | A1 | 5/2011 | Caputo |
| 2012/0021816 | A1 | 1/2012 | Aoki |
| 2012/0108324 | A1 | 5/2012 | King |
| 2013/0053135 | A1 | 2/2013 | King |
| 2016/0055718 | A1 | 2/2016 | Lyons |
| 2016/0314657 | A1 | 10/2016 | Buchholz |
| 2019/0026986 | A1 | 1/2019 | Walsh |
| 2019/0158484 | A1* | 5/2019 | Grunewald ............ G06N 5/022 |
| 2020/0206620 | A1* | 7/2020 | Hayashi .................. A63F 13/35 |

OTHER PUBLICATIONS

Notice of Allowance dated Apr. 1, 2020, for U.S. Appl. No. 16/057,965 (pp. 1-7).

Office Action dated Oct. 5, 2020 for U.S. Appl. No. 16/679,779 (pp. 1-9).

Notice of Allowance dated Mar. 25, 2021 for U.S. Appl. No. 16/679,779 (pp. 1-20).

Corrected Notice of Allowability dated Jun. 3, 2021 for U.S. Appl. No. 16/679,779 (pp. 1-6).

Australian Examination Report No. 1 for App. No. AU201913380 dated May 28, 2024, 3 pages.

* cited by examiner

404

SYSTEMS AND METHODS FOR INCREMENTALLY INCREASING A TIERED PLURALITY OF PROGRESSIVE JACKPOTS

CROSS-REFERENCE TO RELATED APPLICATIONS

This application is a continuation of U.S. patent application Ser. No. 16/679,779, filed Nov. 11, 2019, which is a continuation of and claims the benefit of priority to U.S. patent application Ser. No. 16/057,965, filed 8 Aug. 2018, entitled "SYSTEMS AND METHODS FOR INCREMENTALLY INCREASING A TIERED PLURALITY OF PROGRESSIVE JACKPOTS," the entire contents and disclosures of which, each are hereby incorporated herein by reference in their entireties.

TECHNICAL FIELD

The field of disclosure relates generally to electronic gaming, and more particularly to systems and methods for establishing a tiered plurality of progressive jackpots, and incrementally increasing the tiered plurality of progressive jackpots.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Within a casino, EGMs are often physically grouped in "banks" and arranged to contribute to one or more progressive jackpots. For example, each EGM organized within a bank of EGMs may contribute to a plurality of progressive jackpots, commonly referred to as "linked progressive jackpots" or simply "progressive jackpots" to indicate that the jackpots receive contributions from more than a single EGM. Traditionally, progressive jackpots are increased together, each time a player places a wager, by a small percentage of the wager. For example one or two percent of each wager may be evenly distributed to each progressive jackpot at the same time. One drawback of this method is that the jackpots increase together (rather than one by one), and only by small amounts, each time a wager is made.

Accordingly, systems and methods for incrementally increasing one or more progressive jackpots are desirable. More particularly, systems and methods in which portions of wagers are allocated to progressive jackpots hierarchically or in tiers, from a lowest paying jackpot to a highest paying jackpot, are desirable.

BRIEF DESCRIPTION

In one aspect, an electronic gaming system is provided. The electronic gaming system includes an electronic gaming machine configured to present a wagering game, and a progressive system server communicatively coupled to the electronic gaming machine. The progressive system server configured to establish a tiered plurality of progressive jackpots that includes a first jackpot that is increasable a first cap value, a second jackpot that is increasable to a second cap value greater than the first cap value, and at least one intermediate jackpot that is increasable to at least one intermediate cap value greater than the first cap value and less than the second cap value. The progressive system server is further configured to allocate, based upon a plurality of wager allocation rules and in response to wagers received by the electronic gaming machine, portions of the wagers to one of i) the first jackpot, ii) the at least one intermediate jackpot, and iii) the second jackpot, whereby: the first jackpot is incrementally increased, if the first jackpot is below the first cap value, until the first jackpot reaches the first cap value, the at least one intermediate jackpot is incrementally increased, if the at least one intermediate jackpot is below the at least one intermediate cap value and after the first jackpot reaches the first cap value, until the at least one intermediate jackpot reaches the at least one intermediate cap value, and the second jackpot is incrementally increased, if the second jackpot is below the second cap value and after the at least one intermediate jackpot reaches the at least one intermediate cap value, until the second jackpot reaches the second cap value.

In another aspect, an electronic gaming system is provided. The electronic gaming system includes an electronic gaming machine configured to present a wagering game, and a progressive system server communicatively coupled to the electronic gaming machine. The progressive system server configured to establish a tiered plurality of progressive jackpots, each jackpot increasable to a respective cap value, the cap values increasing, in tiers, from a lowest cap value associated with a lowest paying jackpot in the tiered plurality of progressive jackpots to a highest cap value associated with a highest paying jackpot in the tiered plurality of progressive jackpots. The progressive system server is further configured to add portions of wagers received by the electronic gaming machine to one jackpot of the tiered plurality of progressive jackpots to fill the jackpot to its respective cap value, wherein the tiered plurality of progressive jackpots are filled, in order, from the lowest paying jackpot until the lowest cap value is reached to the highest paying jackpot until the highest cap value is reached, and wherein a jackpot is not filled to a respective cap value until each lower paying jackpot of the tiered plurality of progressive jackpots is filled to a respective cap value.

In yet another aspect, a method of establishing and maintaining a tiered plurality of progressive jackpots is provided. The method includes (i) establishing, by a progressive system server, a tiered plurality of progressive jackpots, the tiered plurality of progressive jackpots including a first jackpot that is increasable a first cap value, a second jackpot that is increasable to a second cap value greater than the first cap value, and at least one intermediate jackpot that is increasable to at least one intermediate cap value greater than the first cap value and less than the second cap value; and (ii) allocating, by the progressive system server and in response to wagers received by an electronic gaming machine, portions of the wagers to only one of i) the first jackpot, ii) the at least one intermediate jackpot, and iii) the second jackpot, whereby the first jackpot is initially increased to the first cap value, the at least one intermediate jackpot is next increased to the at least one intermediate cap value, and the second jackpot is last increased to the second cap value.

BRIEF DESCRIPTION OF THE DRAWINGS

An example embodiment of the subject matter disclosed will now be described with reference to the accompanying drawings.

DETAILED DESCRIPTION

An electronic gaming system for incrementing a tiered plurality of jackpots, from a lowest paying jackpot to a highest paying jackpot, is described. The electronic gaming system includes a progressive system server communicatively coupled, or networked, to a plurality of electronic gaming machines. Each time a player places a wager, such as by selecting a spin button of an electronic gaming machine, a plurality of reels may be spun, and a lowest paying uncapped jackpot in the tiered plurality of progressive jackpots may receive an incremental increase that corresponds to a portion or percentage of the player wager. In addition, the portion or percentage of each wager allocated to a jackpot may increase as jackpots are filled from the lowest paying to the highest paying jackpot. Specifically, a lowest paying jackpot may receive a smallest incremental increase, while a highest paying jackpot may receive a highest incremental increase. Thus, jackpots may incrementally fill from lowest to highest, and the rate of increase may accelerate as jackpots are filled.

As used herein, a “progressive jackpot” and/or a “linked progressive jackpot” is an award that receives contributions from a plurality of electronic gaming machines. For example, a plurality of electronic gaming machines may contribute a specified amount to one or more linked progressive jackpots each time any of the electronic gaming machines are played (e.g., with each wager placed on any of the electronic gaming machines). Over time, the linked progressive jackpots to which each electronic gaming machine contributes may increase or grow, and an indication of the jackpots may be provided to players to increase excitement as well as to encourage additional play. At a certain point, the linked progressive jackpots may be awarded (all or in part) to a player of one of the electronic gaming machines, such as in response to a triggering event occurring on the player’s electronic gaming machine.

Figure 1:
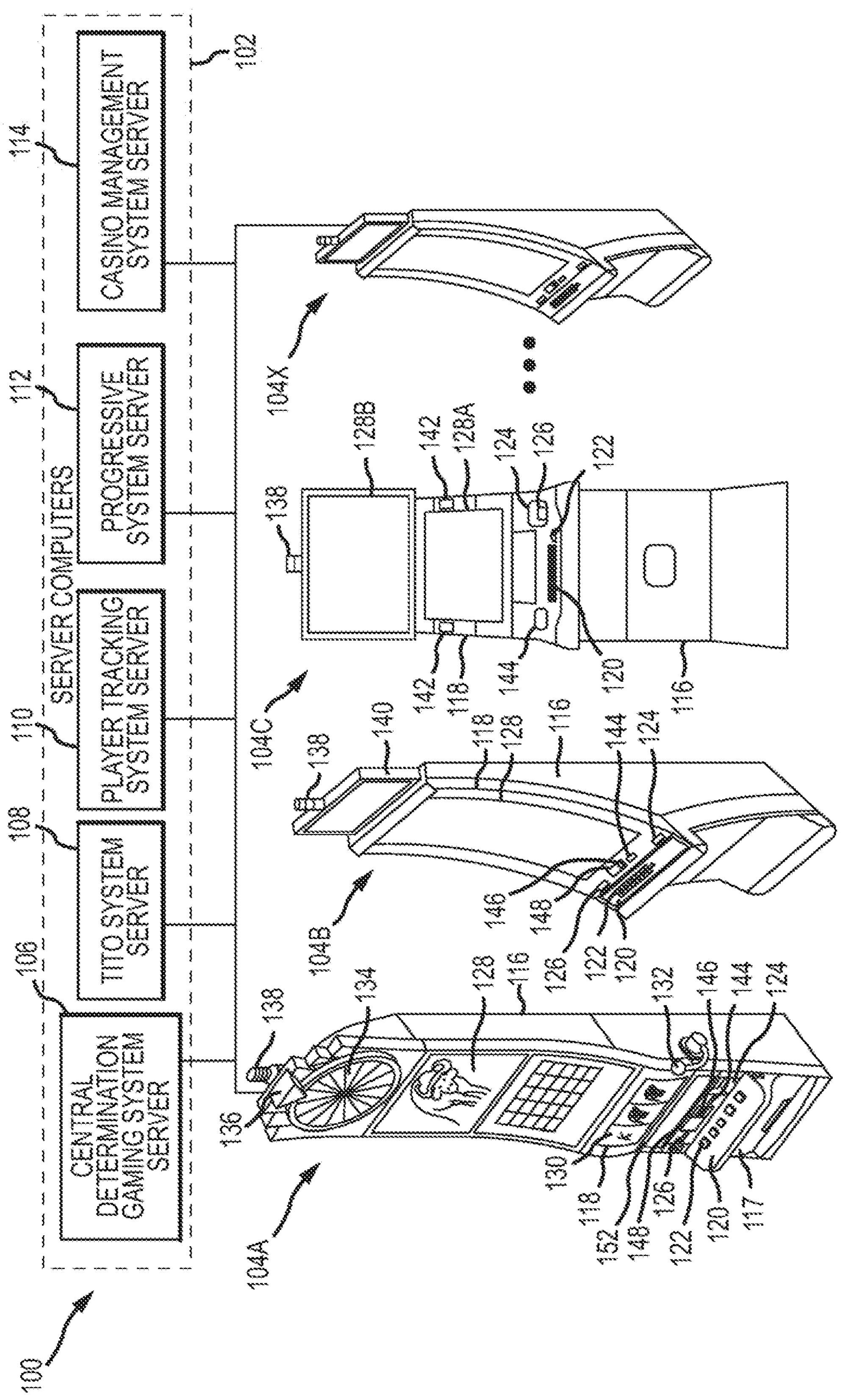
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 117 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a “ticket-in” reader that enables the player to use a casino-issued credit ticket to load credits onto gaming device 104A (e.g., in a cashless TITO system). In such cashless embodiments, gaming device 104A may also include a “ticket-out” printer 126 for outputting a credit ticket when a “cash out” button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player’s smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
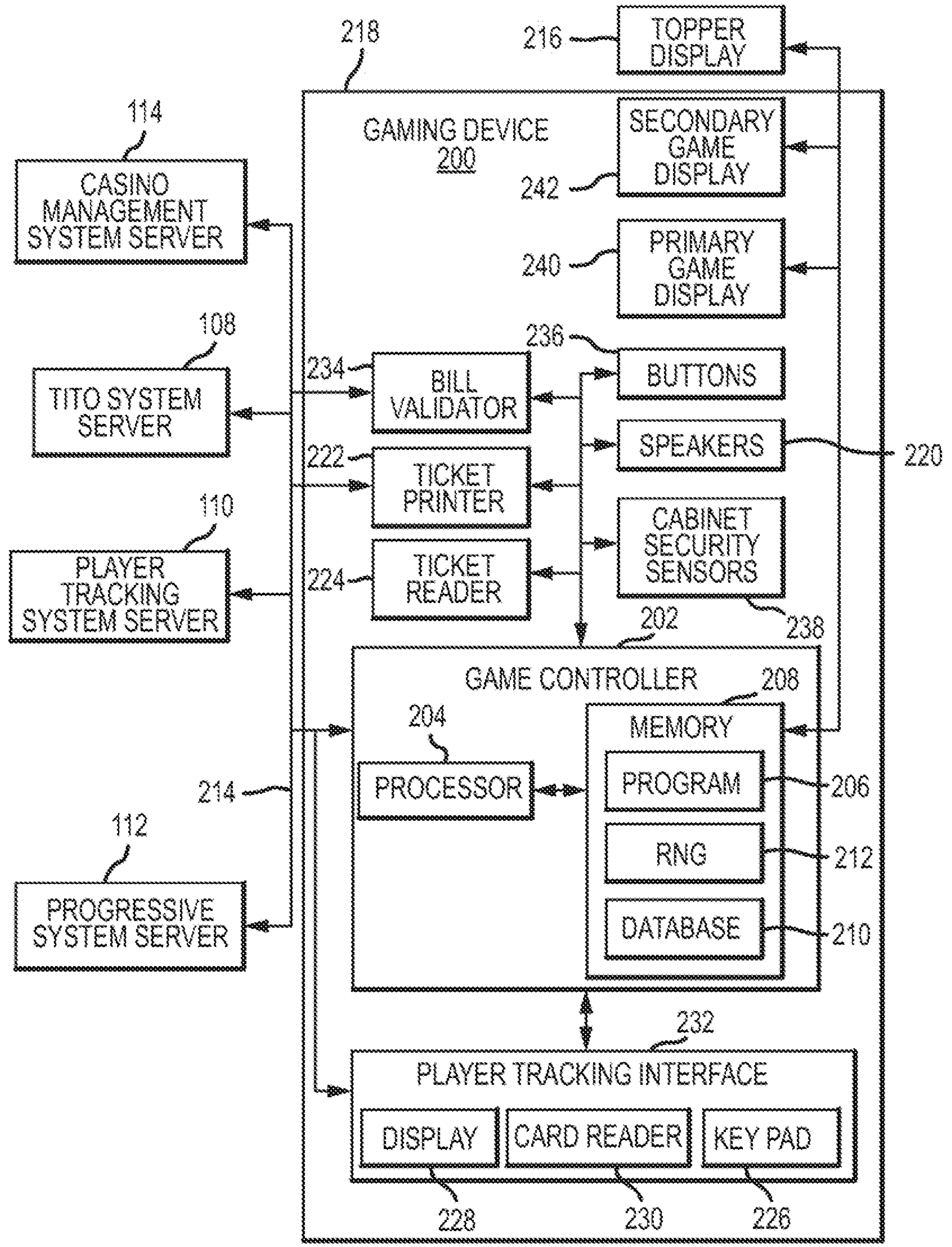
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 117 that opens to provide access to the interior of gaming device 104B. Main door 117, or service door, is typically used by service personnel to refill ticket-out printer 126 and collect bills and tickets inserted into bill validator 124. Main door 117 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A may include a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
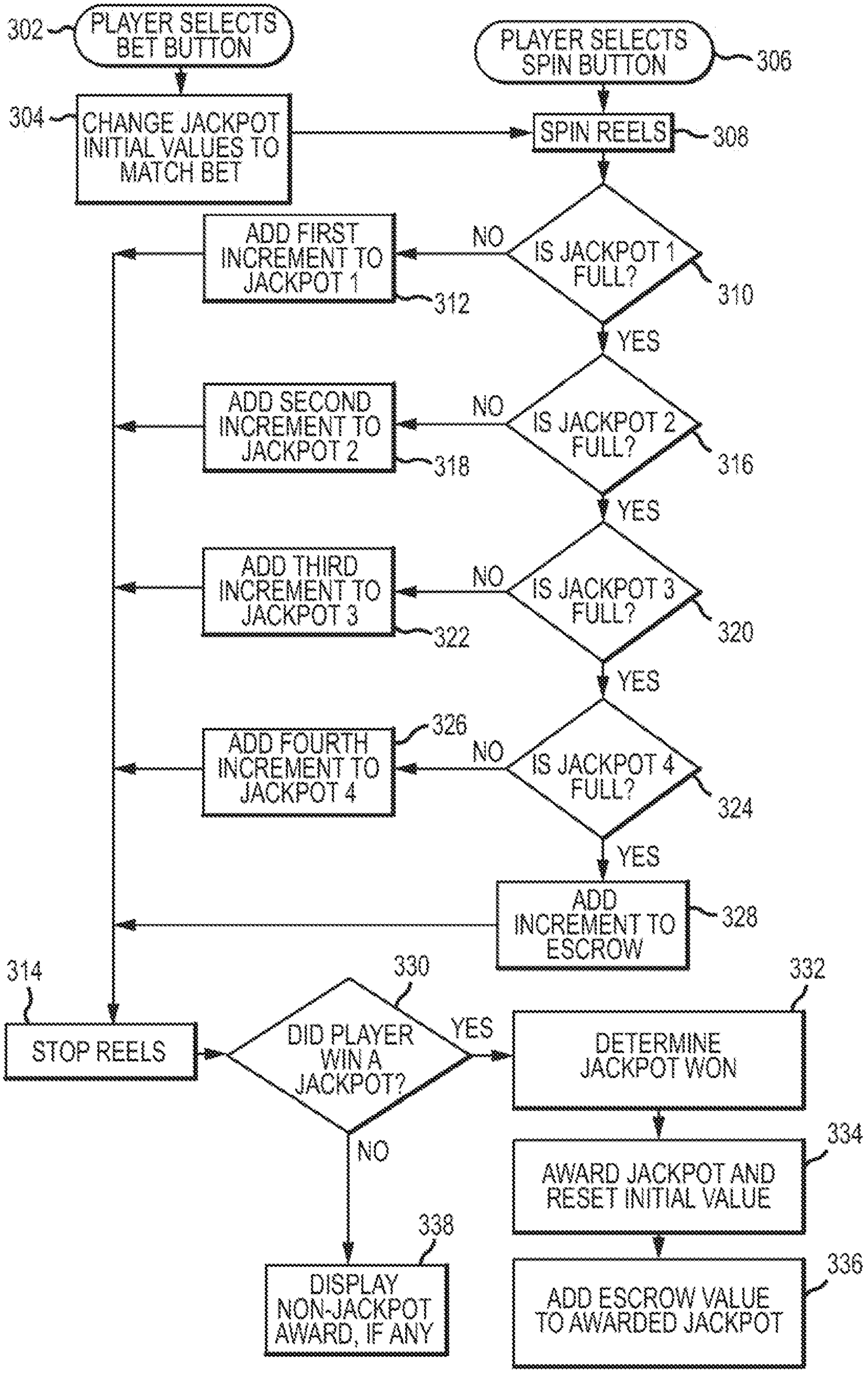
FIG. 3 is a flowchart illustrating an exemplary process for incrementally increasing each jackpot of a tiered plurality of progressive jackpots, one at a time, based upon portions of wagers received from one or more EGMs, as shown in FIG. 1 and FIG. 2.

FIG. 3 is a flowchart illustrating an exemplary process 300 for playing a wagering game and incrementally increasing, during the wagering game, one or more jackpots of a tiered plurality of progressive jackpots. The steps illustrated by process 300 specify or describe a plurality of wager allocation rules for filling the one or more jackpots based upon an amount associated with each jackpot (e.g., each step of process 300 may be regarded as a wager allocation rule). In general, and as described in greater detail herein, each jackpot of the tiered plurality of progressive jackpots may be organized hierarchically, or in tiers, and may receive portions or increments of player wagers only when a jackpot lower in the tier structure has been incremented to a corresponding cap value. In other words, the tiered plurality of progressive jackpots may be incrementally increased, or "filled," from a lowest paying jackpot to a highest paying jackpot, such that the lower paying jackpots are filled to corresponding cap values before higher paying jackpots are filled.

In the exemplary embodiment, a player may interact with an EGM 104A-104X, as described herein, to establish an initial wager amount (step 302). For example, as described above, a player may specify an initial wager amount via button deck 120. In response to selection of an initial wager amount, progressive system server 112 may receive the initial wager amount and, in response, establish an initial (or "reset") value for each jackpot in a tiered plurality of progressive jackpots (step 304). As described below, an initial value is a value below which a jackpot may not be permitted to decrease. In addition, a jackpot may be "reset" to an initial value after the jackpot is paid out.

Figure 4:
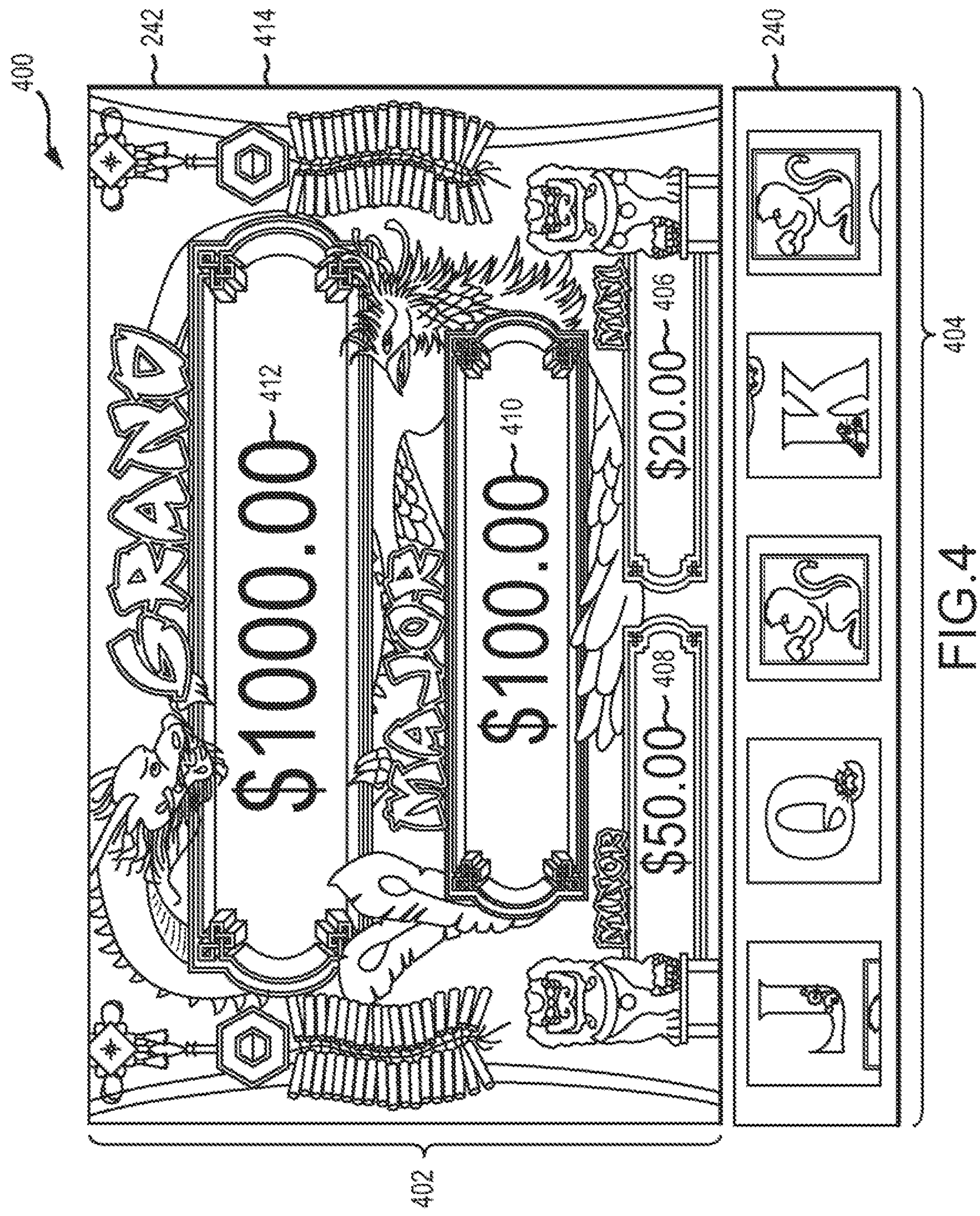
FIG. 4 is a schematic view of an illustrative wagering game that includes a tiered plurality of progressive jackpots and a plurality of reels, in which each jackpot of the tiered plurality of progressive jackpots is established and is configured to be increased from a corresponding initial value.

FIG. 4 is a schematic view of an exemplary wagering game 400 that includes a tiered plurality of progressive jackpots 402 and a plurality of reels 404, such as a simulated rotating plurality of reels. In various embodiments, wagering game 400 may be a primary game and/or a bonus game triggered from a primary game.

Tiered plurality of progressive jackpots 402 and reels 404 may be displayed in any suitable manner. For example, in some embodiments, tiered plurality of progressive jackpots 402 may be displayed on secondary game display 242 and/or another secondary display, such as an overhead sign. Similarly, in at least some embodiments, reels 404 are not mechanical reels but simulated or "virtual" reels displayed on primary game display 240. However, in other embodiments, reels 404 may include one or more mechanical reels.

Each reel of plurality of reels 404 may include a plurality of symbols. In addition, each reel of plurality of reels 404 may be spun and stopped (e.g., in a simulation or physically) to show a symbol combination. As described below, the symbol combination displayed on reels 404, once stopped, may, in addition, be evaluated by processor 204 to determine whether the combination of stopped and displayed symbols corresponds to a winning game outcome and/or to determine whether the displayed symbol combination corresponds to one or more progressive jackpots of tiered plurality of progressive jackpots 402. If the symbol combination corresponds to a winning game outcome, a game award may be provided to the player in accordance with a paytable that correlates the displayed combination of symbols to the game award. Similarly, if the symbol combination corresponds to a progressive jackpot, the progressive jackpot to which the symbol combination corresponds may be provided to the player.

In the exemplary embodiment, each jackpot of tiered plurality of progressive jackpots 402 is configured to be incrementally increased from a corresponding initial (or "reset") value to a corresponding maximum (or "cap") value. As described herein, a jackpot may not be permitted to decrease below a corresponding initial value, and the jackpot may not be allowed to increase beyond a corresponding cap value. Accordingly, tiered plurality of progressive jackpots 402 may include a first, smallest, progressive jackpot 406 (or a "first jackpot"), a second, intermediate, progressive jackpot 408 (or a "second jackpot"), a third, intermediate, progressive jackpot 410 (or a "third jackpot"), and a fourth, largest, progressive jackpot 412 (or a "fourth jackpot"). Although four progressive jackpots 406-412 are illustrated, it will be appreciated that any suitable number of progressive jackpots may be implemented and are within the scope of the present disclosure.

Thus, first jackpot 406 may be associated with a first initial value and a first cap value, second jackpot 408 may be associated with a second initial value and a second cap value, third jackpot 410 may be associated with a third initial value and a third cap value, and fourth jackpot 412 may be associated with a fourth initial value and a fourth cap value. Each initial value may be adjusted (e.g., increased or decreased) at the start of gameplay, such as, for example, based upon an initial wager amount specified by the player (as described above). For example, progressive system server 112 may reduce one or more initial values when a player specifies a smaller initial wager amount. Likewise, progressive system server 112 may increase one or more initial values when a player specifies a larger initial wager amount.

In the exemplary embodiment, a first initial value of first jackpot 406 is $20.00, and a first cap value of first jackpot 406 is $49.00. Similarly, a second initial value of second jackpot 408 is $50.00, and a second cap value of second jackpot 408 is $99.00. Further, a third initial value of third jackpot 410 is $100.00, and a third cap value of third jackpot 410 is $999.00. Further still, a fourth initial value of fourth jackpot 412 is $1000.00, and a fourth cap value of fourth jackpot 412 is $9,999.00. However, these initial and cap values are merely illustrative and may vary depending, for example, upon a number of jackpots in tiered plurality of progressive jackpots 402, an initial wager amount (as described above), and/or one or more other game rules.

Thus, jackpots 406-412 may be associated with a respective initial value and a respective cap value. In addition, as described above, the initial values and cap values associated with each jackpot 406-412 may increase in non-overlapping tiers or ranges. For example, in at least one embodiment, second jackpot 408 may be associated with an initial value of $50.00 and a cap value of $99.00, while first jackpot may be associated with a lower initial value (e.g., $20.00) and a lower cap value (e.g., $49.00). In other words, the range of possible values of first jackpot 406 (e.g., $20.00-$49.00) is less than the range of possible values of second jackpot 408 (e.g., $50.00-$99.00), and so on, for all jackpots 406-412.

As a result, jackpots 406-412 may be organized in one or more tiers. For example, first jackpot 406 may occupy a first, or lowest, tier and second jackpot 408, which is associated within an initial value that is greater than the first cap value of first jackpot 406, may occupy a second, or intermediate tier. Similarly, third jackpot 410, which is associated with an initial value that is greater than the second cap value of second jackpot 408, may occupy a third, or another intermediate tier, and fourth jackpot, which is associated with an initial value that is greater than the third cap value of third jackpot 410, may occupy a fourth, highest, tier. Accordingly, jackpots 406-412 may be organized in tiers according to their respective cap values, such as from a lowest paying jackpot (e.g., first jackpot 406) to a highest paying jackpot (e.g., fourth jackpot 412).

Visually, jackpots 406-412 may be vertically displayed, such that lower paying jackpots are displayed lower in a tier structure 414 or hierarchy of jackpots than higher paying jackpots. However, in some embodiments, jackpots 406-412 may not be displayed in a vertical tier structure 414 of progressive jackpots. In addition, even where jackpots 406-412 are not displayed in a vertical tier structure 414 of progressive jackpots, each jackpot 406-412 may still be regarded as occupying a level or tier of the tier structure 414. For example, first jackpot 406 and second jackpot 408 may be displayed substantially parallel to one another (as shown at FIG. 4); however, first jackpot 406 may still be regarded as occupying a first or lowest tier, and second jackpot 408 may be regarded as occupying a second, next highest, tier.

With returning reference to FIG. 3, a player may select an option to spin reels 404, such as, for example, using a spin button of button deck 120 (step 306). In response, reels 404 may be spun (or may appear to spin, in the case of simulated or virtual reels) (step 308). Progressive system server 112 may, in addition, receive an indication that the option to spin reels 404 has been selected, and progressive system server 112 may, in response, determine a value of first jackpot 406. Specifically, progressive system server 112 may determine, each time reels 404 are spun, whether the value of first jackpot 406 is equal, or substantially equal, to the corresponding first cap value (step 310).

As used herein, if a value of a jackpot 406-412 is equal, or substantially equal, to a corresponding cap value, the jackpot 406-412 may be regarded as "full," in that the jackpot 406-412 may not be increased further, as described herein, without exceeding the corresponding cap value of the jackpot 406-412. Further, as used herein, a value of a jackpot 406-412 may be "substantially equal" to an associated cap value if the value of the jackpot 406-412 is within $5.00 of the associated cap value.

In response to a determination that first jackpot 406 is not full (and is capable of receiving an incremental increase), progressive system server 112 may allocate a portion of one or more wagers to first jackpot 406 (step 312). For example, progressive system server 112 may allocate a portion, such as a specified first portion or percentage, of the initial wager amount specified by the player (as described above) to first jackpot 406. In various embodiments, each time the player selects the spin button, progressive system server 112 may allocate the first portion or percentage of successive player wagers to first jackpot 406 until first jackpot 406 reaches, or substantially reaches, the first cap value.

In other words, each time the player selects the spin button, the first portion or percentage of the amount wagered in response to selection of the spin button may be allocated to first jackpot 406 until first jackpot 406 reaches the corresponding first cap value. In at least one embodiment, the first portion or percentage of wagers allocated to first jackpot 406 is in the range of 2-4% of an amount wagered. Thus, first jackpot 406 may be incrementally increased, each time a player selects the spin button, until first jackpot 406 is full. Once the first portion or percentage of a wager is allocated to first jackpot 406, processor 204 may stop reels 404 and/or evaluate reels 404, as described herein (step 314).

Figure 5:
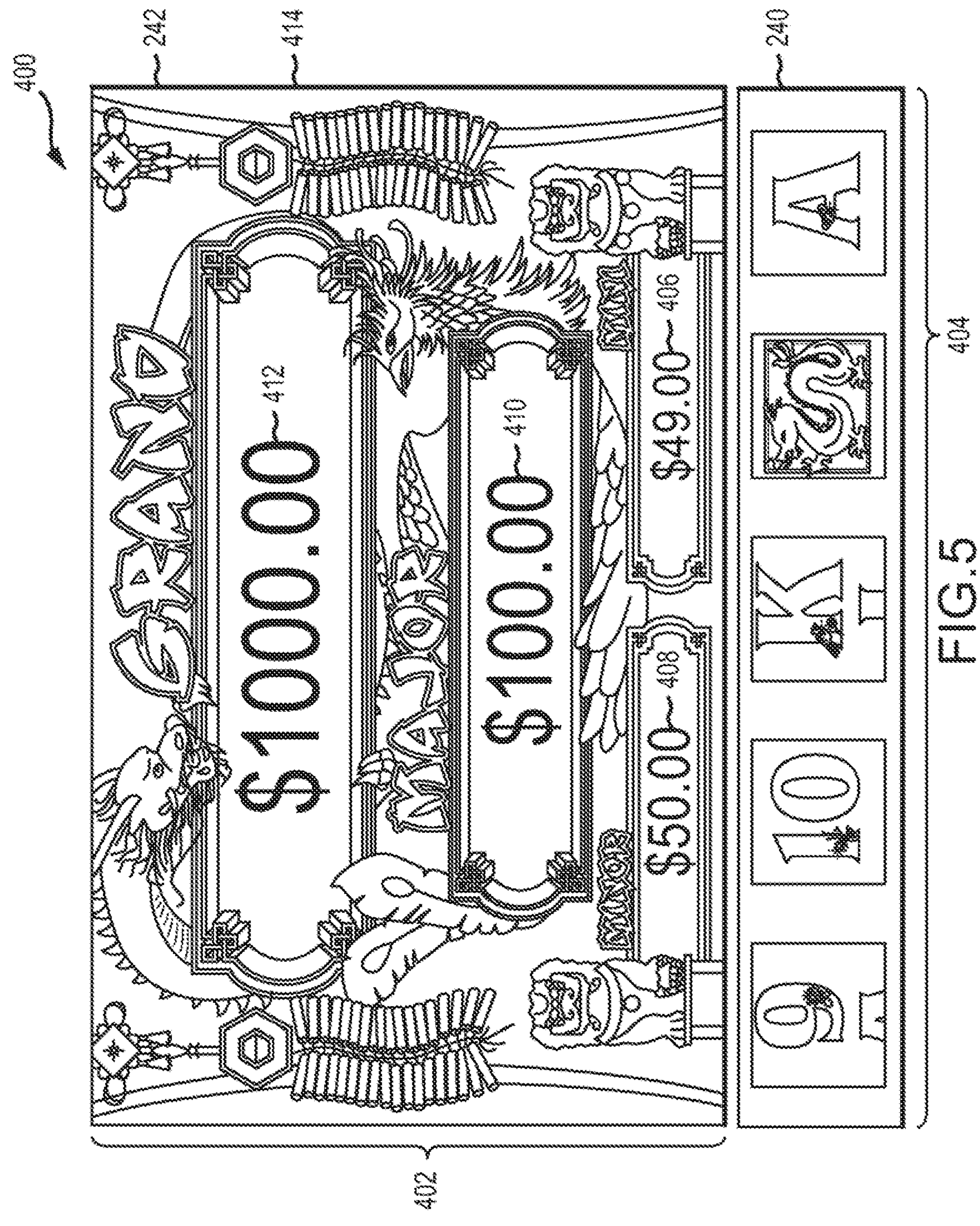
FIG. 5 is a schematic view of the illustrative wagering game shown in FIG. 4, in which a first jackpot of the tiered plurality of progressive jackpots is filled to a first cap value.

FIG. 5 is a schematic view of wagering game 400, including tiered plurality of progressive jackpots 402 and reels 404, in which first jackpot 404 is filled to a first cap value. Specifically, in the wagering game 400 shown at FIG. 5, a player has placed a number of wagers, each resulting in a spin of reels 404, and first jackpot 406 has been incrementally increased, as described above, to a first cap value of $49.00. Second jackpot 408, third jackpot 410, and fourth jackpot 412 have not been increased beyond their respective initial values. Rather, progressive system server 112 has incremented first jackpot 404 all the way to the corresponding first cap value prior to permitting increases to the remaining jackpots 408-412.

If it is determined by progressive system server 112 that first jackpot 406 is equal, or substantially equal, to the corresponding first cap value (e.g., if it is determined that first jackpot 406 is full), progressive system server 112 may determine a value of a next jackpot in tier structure 414. Specifically, in the exemplary embodiment, progressive system server 112 may determine whether the value of second jackpot 408 is equal, or substantially equal, to the corresponding second cap value (step 316). In other words, progressive system server 112 may determine whether second jackpot 408 is full.

In response to a determination that second jackpot 408 is not full, progressive system server 112 may allocate a portion or percentage of one or more wagers to second jackpot 408. More particularly, progressive system server 112 may allocate a second portion or percentage of wagers to second jackpot 408 in response to a determination that first jackpot 406 is full and that second jackpot 408 is not full (step 318). As described above, each time the player selects the spin button, progressive system server 112 may allocate the second portion or percentage of successive player wagers to second jackpot 408 until second jackpot 408 reaches, or substantially reaches, the second cap value.

In at least one embodiment, the second portion or percentage of wagers allocated to second jackpot 408 is in the range of 3-6% of an amount wagered. Thus, second jackpot 408 may be incrementally increased, each time a player selects the spin button, until second jackpot 408 is full. Once the second portion or percentage of a wager is allocated to second jackpot 408, processor 204 may stop reels 404 and/or evaluate reels 404, as described herein (step 314).

Figure 6:
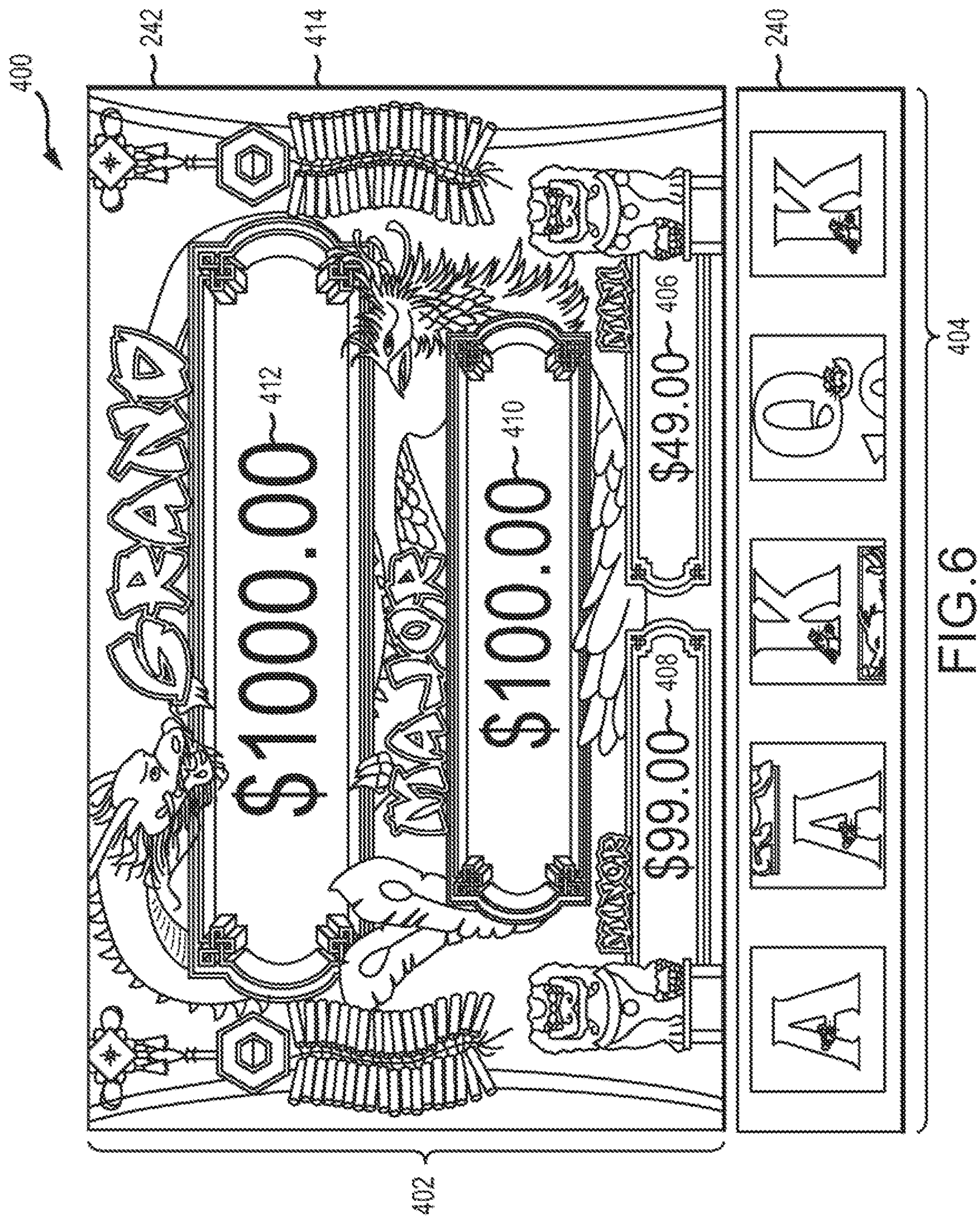
FIG. 6 is a schematic view of the illustrative wagering game shown in FIG. 4, in which a second jackpot of the tiered plurality of progressive jackpots is filled to a second cap value after the first jackpot is filled to the first cap value.

FIG. 6 is a schematic view of wagering game 400, including tiered plurality of progressive jackpots 402 and reels 404, in which first jackpot 404 is filled to a first cap value, and in which second jackpot 406 is filled to a second cap value. Specifically, in the wagering game 400 shown at FIG. 6, a player has placed a number of wagers, each resulting in a spin of reels 404, and first jackpot 406 has been incrementally increased, as described above, to a first cap value of $49.00. Likewise, second jackpot 408 has been increased to a second cap value of $99.00 (e.g., after first jackpot 406 was filled). Third jackpot 410 and fourth jackpot 412 have not been increased beyond their respective initial values. Rather, progressive system server 112 has incremented first jackpot 404 and second jackpot 406 all the way to their corresponding cap values prior to permitting increases to the remaining jackpots 410-412.

If it is determined by progressive system server 112 that first jackpot 406 and second jackpot 408 are full, progressive system server 112 may determine a value of a next jackpot in tier structure 414. Specifically, in the exemplary embodiment, progressive system server 112 may determine whether the value of third jackpot 410 is equal, or substantially equal, to the corresponding third cap value (step 320). In other words, progressive system server 112 may determine whether third jackpot 410 is full.

In response to a determination that third jackpot 410 is not full, progressive system server 112 may allocate a portion or percentage of one or more wagers to third jackpot 410. More particularly, progressive system server 112 may allocate a third portion or percentage of wagers to third jackpot 410 in response to a determination that first jackpot 406 is full, that second jackpot 408 is also full, and that third jackpot 410 is not full (step 322). As described above, each time the player selects the spin button, progressive system server 112 may allocate the third portion or percentage of successive player wagers to third jackpot 410 until third jackpot 410 reaches, or substantially reaches, the third cap value.

In at least one embodiment, the third portion or percentage of wagers allocated to third jackpot 410 is in the range of 4-8% of an amount wagered. Thus, third jackpot 410 may be incrementally increased, each time a player selects the spin button, until third jackpot 410 is full. Once the third portion or percentage of a wager is allocated to third jackpot 410, processor 204 may stop reels 404 and/or evaluate reels 404, as described herein (step 314).

Figure 7:
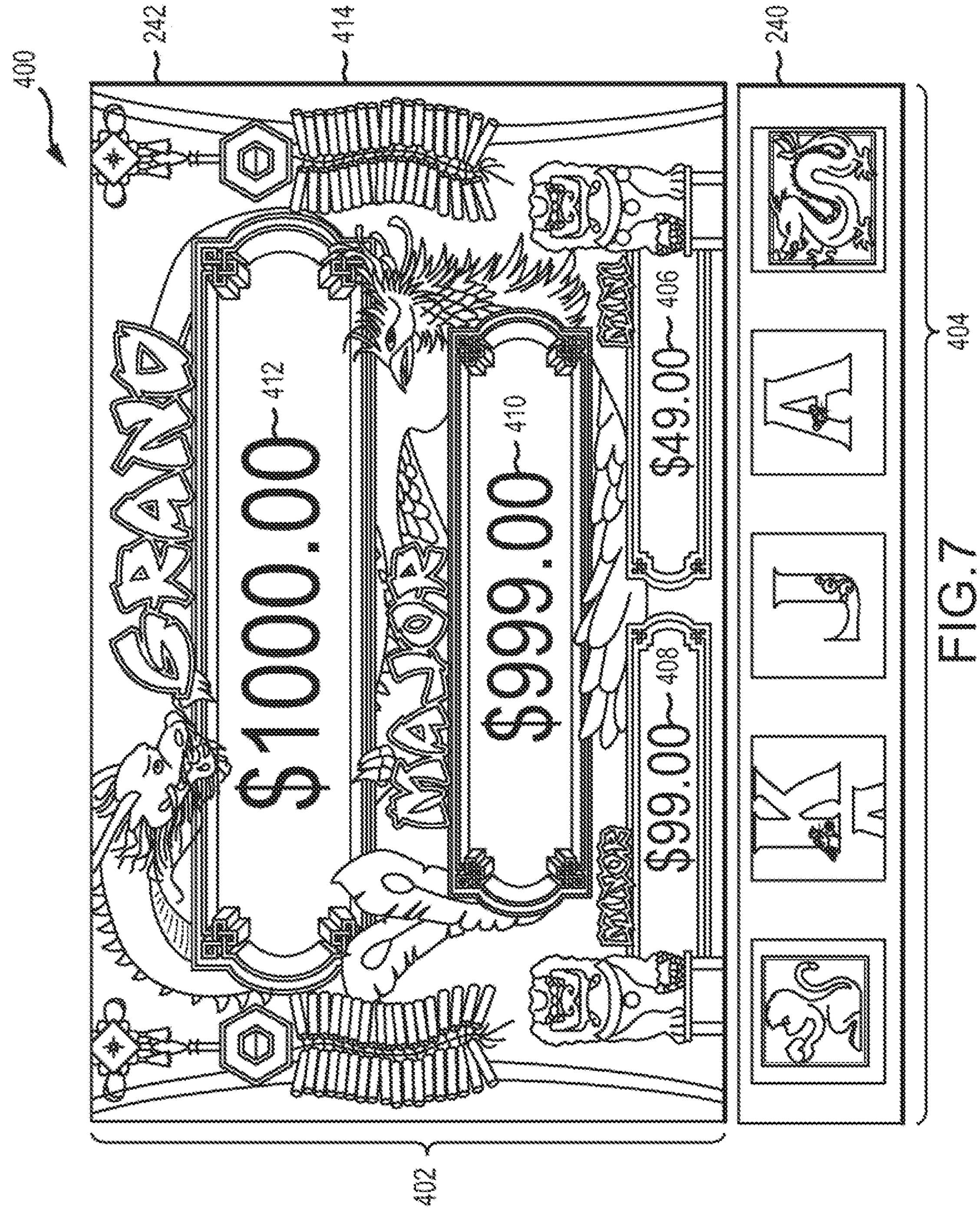
FIG. 7 is a schematic view of the illustrative wagering game shown in FIG. 4, in which a third jackpot of the tiered plurality of progressive jackpots is filled to a third cap value after the second jackpot is filled to the second cap value.

FIG. 7 is a schematic view of wagering game 400, including tiered plurality of progressive jackpots 402 and reels 404, in which first jackpot 404 is filled to a first cap value, second jackpot 406 is filled to a second cap value, and third jackpot 410 is filled to a third cap value. Specifically, in the wagering game 400 shown at FIG. 7, a player has placed a number of wagers, each resulting in a spin of reels 404, and first jackpot 406 has been incrementally increased, as described above, to a first cap value of $49.00. Likewise, second jackpot 408 has been increased to a second cap value of $99.00, and third jackpot has been increased to a third cap value of $999.00. Fourth jackpot 412 has not been increased beyond a respective initial value. Rather, progressive system server 112 has incremented first jackpot 404, second jackpot 406, and third jackpot 408 all the way to their corresponding cap values prior to permitting increases to the remaining jackpot 412.

If it is determined by progressive system server 112 that first jackpot 406, second jackpot 408, and third jackpot 410 are full, progressive system server 112 may determine a value of a next jackpot in tier structure 414. Specifically, in the exemplary embodiment, progressive system server 112 may determine whether the value of fourth jackpot 412 is equal, or substantially equal, to the corresponding fourth cap value (step 324). In other words, progressive system server 112 may determine whether fourth jackpot 412 is full.

In response to a determination that fourth jackpot 412 is not full, progressive system server 112 may allocate a portion or percentage of one or more wagers to fourth jackpot 412. More particularly, progressive system server 112 may allocate a fourth portion or percentage of wagers to fourth jackpot 412 in response to a determination that first jackpot 406 is full, that second jackpot 408 is full, that third jackpot 410 is full, and that fourth jackpot 412 is not full (step 326). As described above, each time the player selects the spin button, progressive system server 112 may allocate the fourth portion or percentage of successive player wagers to fourth jackpot 412 until fourth jackpot 412 reaches, or substantially reaches, the fourth cap value.

In at least one embodiment, the fourth portion or percentage of wagers allocated to fourth jackpot 412 is in the range of 6-12% of an amount wagered. Thus, fourth jackpot 412 may be incrementally increased, each time a player selects the spin button, until fourth jackpot 412 is full. Once the fourth portion or percentage of a wager is allocated to fourth jackpot 412, processor 204 may stop reels 404 and/or evaluate reels 404, as described herein (step 314).

Figure 8:
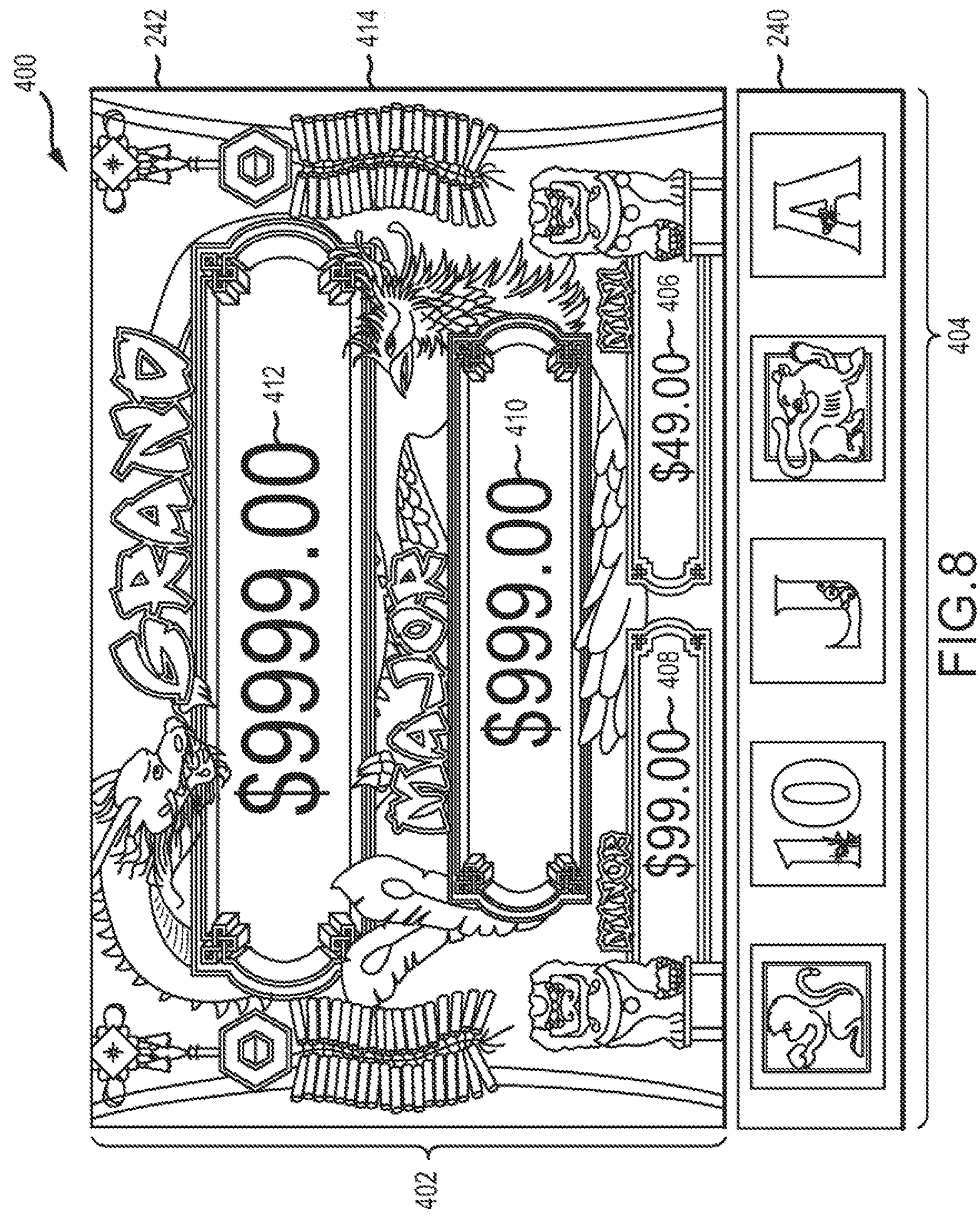
FIG. 8 is a schematic view of the illustrative wagering game shown in FIG. 4, in which a fourth jackpot of the tiered plurality of progressive jackpots is filled to a fourth cap value after the third jackpot is filled to the third cap value.

FIG. 8 is a schematic view of wagering game 400, including tiered plurality of progressive jackpots 402 and reels 404, in which first jackpot 404 is filled to a first cap value, second jackpot 406 is filled to a second cap value, third jackpot 410 is filled to a third cap value, and fourth jackpot 412 is filled to a fourth cap value. Specifically, in the wagering game 400 shown at FIG. 8, a player has placed a number of wagers, each resulting in a spin of reels 404, and first jackpot 406 has been incrementally increased, as described above, to a first cap value of $49.00. Likewise, second jackpot 408 has been increased to a second cap value of $99.00, third jackpot has been increased to a third cap value of $999.00, and fourth jackpot has been increased to a fourth cap value of $9,999.00.

In the exemplary embodiment, if it is determined by progressive system server 112 that first jackpot 406, second jackpot 408, third jackpot 410, and fourth jackpot 412 are full, progressive system server 112 may allocate a portion or percentage of all subsequent wagers to an escrow account maintained by progressive system server 112 (step 328). The escrow account may accumulate percentages of portions of wagers to any value when all jackpots 406-412 in tiered plurality of progressive jackpots 402 are full. In other words, the escrow account may not be capped. In various embodiments, the value of the escrow account may not be displayed for a player. However, in other embodiments, the value of the escrow account may be displayed as well. The portion of percentage allocated to the escrow account may, in addition, vary. In at least one embodiment, the portion of percentage of wagers allocated to the escrow account is in the range of 0.01-4% of wager amounts received. In other embodiments, the portion of percentage of the wagers allocated to the escrow account may be less than a percentage allocated to at least one jackpot of the tiered plurality of jackpots.

In addition, once a wager has been received and a portion thereof allocated to one of jackpots 406-412 and/or to the escrow account, processor 204 may stop reels 404 (step 314). Further, once reels 404 are stopped, a symbol combination may be displayed from each of reels 404, as described above. The stopped and displayed symbol combination may be evaluated by processor 204 (and/or progressive system server 112) to determine whether the player is entitled to a game award.

Specifically, the combination of symbols may be further evaluated by processor 204 and/or progressive system server 112 to determine whether the player is entitled to a jackpot 406-412 (step 330). For example, the combination of symbols may be compared to a jackpot paytable of wagering game 400 to determine whether, and to which, jackpot

406-412 the player is entitled (step 332). In some embodiments, the jackpot paytable is a weighted paytable. However, in other embodiments, the jackpot paytable is any paytable that correlates one or more symbol combinations to one or more jackpot awards.

In response to a determination that the player is entitled to a jackpot 406-412, processor 204 and/or progressive system server 112 may provide the jackpot 406-412 to which the player is entitled to the player (step 334). For example, the jackpot 406-412 may be paid out to the player in the form of a printed ticket and/or all or a portion of the jackpot 406-412 may be deducted from the jackpot 406-412 itself and added to a credit balance of the player.

Once the jackpot 406-412 is paid out, progressive system server 112 may also reset the jackpot 406-412 to its corresponding initial value, opening the jackpot 406-412 for new or additional allocations, as described above (step 334). In some embodiments, the value of the escrow account may be added, all or in part, to the initial jackpot value (step 336). For example, if the escrow account contains a balance of $10.00, all or a portion of this amount may be added to the initial value of a jackpot 406-412 paid out to a player to "seed" the recently awarded jackpot 406-412 to a value that is greater than the initial value of the jackpot 406-412.

Figure 9:
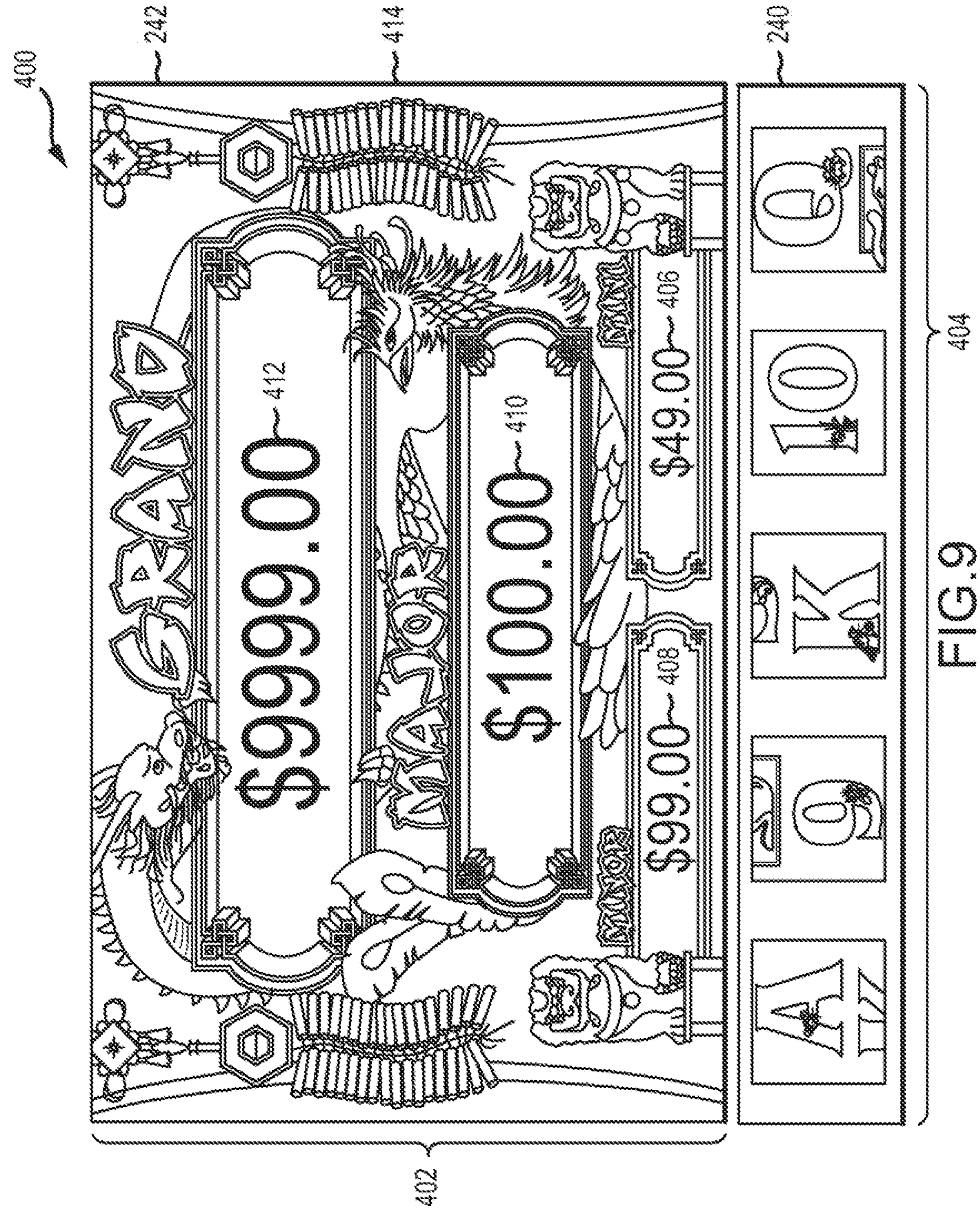
FIG. 9 is a schematic view of the illustrative wagering game shown in FIG. 4, in which the third jackpot of the tiered plurality of progressive jackpots is reduced, after a jackpot win, to a corresponding initial value.

FIG. 9 is a schematic view of wagering game 400, including tiered plurality of progressive jackpots 402 and the reels 404, in which third jackpot 410 is reduced, after a jackpot win, to a corresponding initial value. Specifically, and as shown, third jackpot 410 was paid to a player in its entirety and is reduced, as a result, to an initial value of $100.00. Although not shown, a value of the escrow account, if any, may be added to the initial value of $100.00 to seed third jackpot 410 after being won by a player.

Moreover, in the example shown, first jackpot 406, second jackpot 408, and fourth jackpot 412 are still full. As a result, subsequent wagers placed by a player may be allocated, as described herein, to third jackpot 410. Specifically, progressive system server 112 may determine, in response to a player wager and as described above, that first jackpot 406 and second jackpot 408 are full. However, because third jackpot 410 is no longer full, progressive system server 112 may allocate portions or percentages of wagers received to third jackpot 410 until a lower paying jackpot is paid out and/or until third jackpot 410 is once again full.

Figure 10:
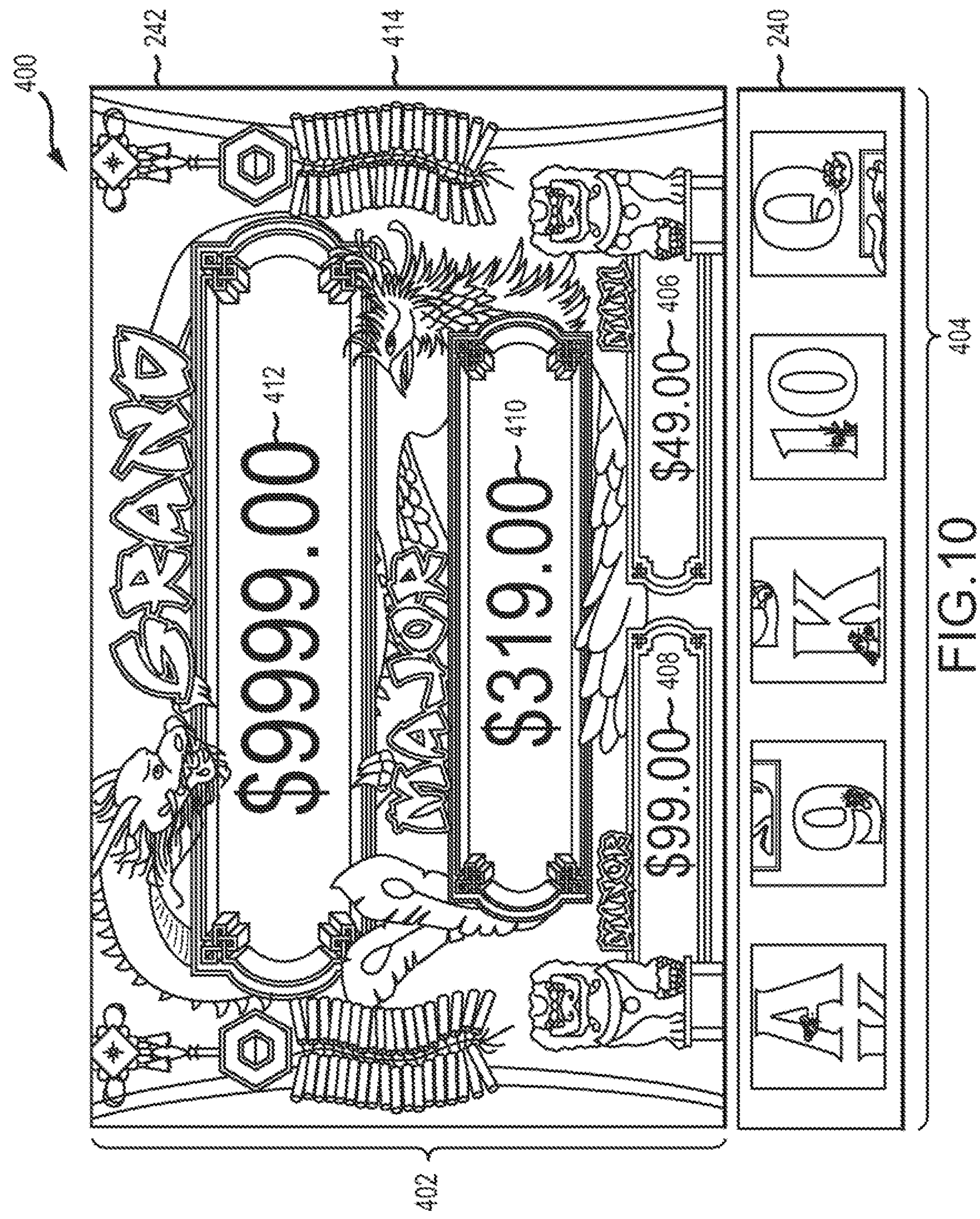
FIG. 10 is a schematic view of the illustrative wagering game shown in FIG. 9, in which the third jackpot of the tiered plurality of progressive jackpots is incrementally increased from its initial value to a value less than the third cap value.
Figure 11:
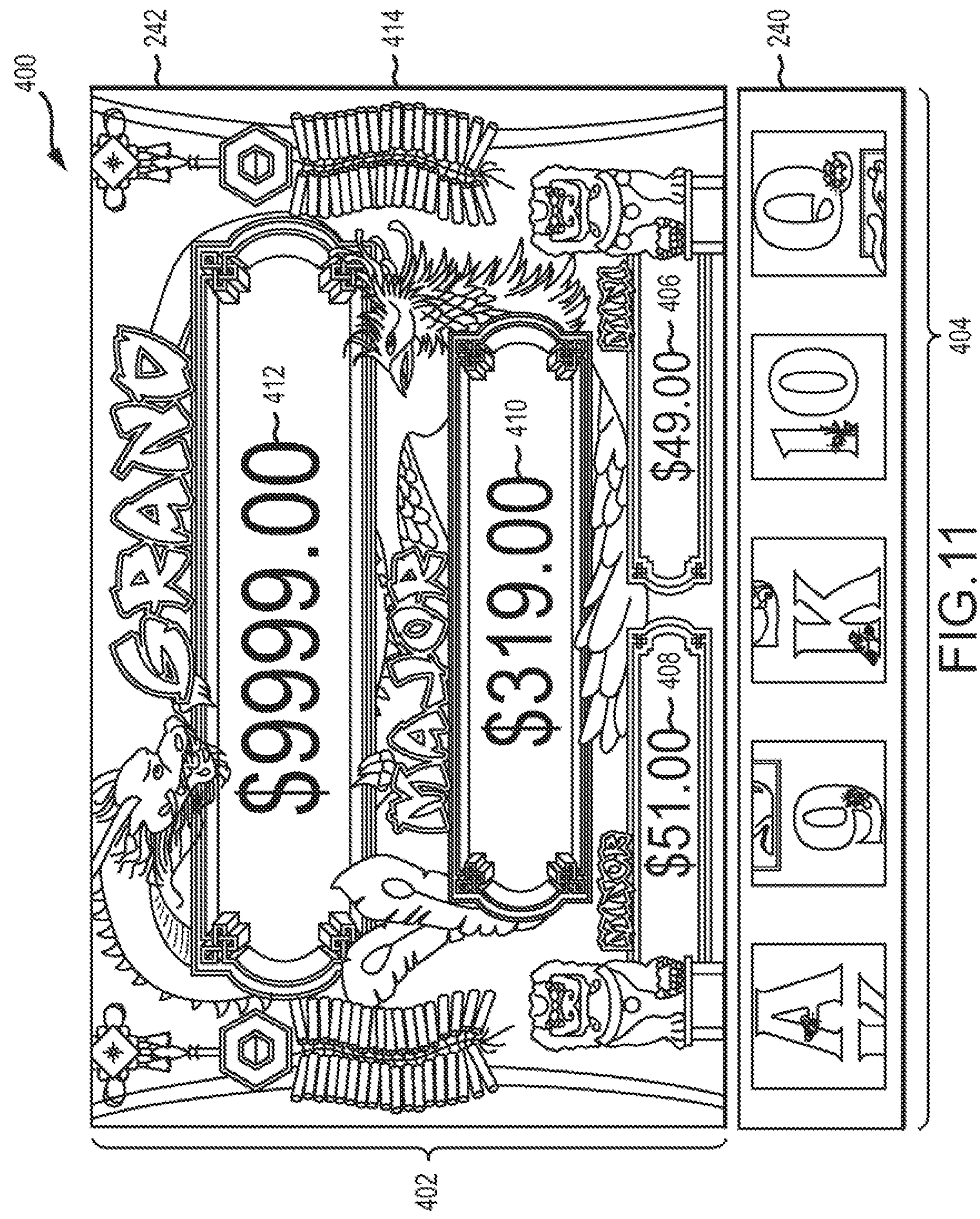
FIG. 11 is a schematic view of the illustrative wagering game shown in FIG. 10, in which the second jackpot of the tiered plurality of progressive jackpots is reduced, after a jackpot win, to a corresponding initial value and increased from the initial value to a value less than the second cap value

Such an example is illustrated with respect to FIG. 10 and FIG. 11. Specifically, as shown with reference to FIG. 10, a schematic view of wagering game 400 is shown, in which third jackpot 410 is incrementally increased from its initial value (of $100.00) to a value less than the third cap value. As described herein, each time the player places a wager, a portion or percentage of the wager is incrementally allocated to third jackpot 410, if no lower paying jackpot in the tiered plurality of jackpots 402 is uncapped, until third jackpot 410 once again reaches the third cap value. In the example shown, third jackpot 410 has been incrementally increased to an intermediate or uncapped value of $319.00. However, it will be appreciated that third jackpot 410 may be incrementally increased to any value less than or equal to the third cap value.

If, however, a lower paying jackpot, such as either or both of first jackpot 406 and/or second jackpot 408, are uncapped or paid out while third jackpot 410 is still incrementally increasing towards the third cap value, subsequent portions or percentages of wagers received may not continue to be allocated (as described above) to third jackpot 410, but to the one or more awarded lower paying jackpots (e.g., first jackpot 406 and/or second jackpot 408) until these jackpots are once again full (e.g., until they once again reach their respective cap values).

An example of a case in which third jackpot 410 has not yet reached its respective cap value and in which second jackpot 408 is uncapped is illustrated in FIG. 11. As shown, third jackpot 410 is halted at the intermediate value of $319.00, and second jackpot 408 is reduced to its initial value (of $50.00) and begins to incrementally increase towards its respective cap value. Specifically, in the example, allocations have only just begun to second jackpot 408, and it has only been increased to an intermediate value of $51.00. While second jackpot 408 increases towards its respective cap value, third jackpot 410 remains at the value (of $319.00) to which it had been incrementally increased prior to second jackpot 408 being awarded, until second jackpot 408 is once again full. If first jackpot 406 were to be paid out during this time period, as described herein, allocations would not be provided to either of second jackpot 408 or to third jackpot 410 until first jackpot 406 was once again full. Thus, during gameplay, increments to jackpots 406-412 may stop and start, depending, for example, upon the status of one or more lower paying jackpots 406-412.

Finally, the combination of symbols may also be compared to a paytable of wagering game 400 to determine whether the player is entitled to a non-jackpot game award (step 338). For example, if wagering game 400 is a base game, the combination of symbols may be compared to a base game paytable of wagering game 400 to identify a base game award associated with the combination of symbols. Likewise, if wagering game 400 is a bonus game, the combination of symbols may be compared to a bonus game paytable of wagering game 400 to determine a bonus game award associated with the combination of symbols.

If the player is entitled to a non-jackpot game award, the non-jackpot game award may be paid out, such as, for example, in the form of a printed ticket and/or as an automatic credit to the player's credit balance, and gameplay may return to step 302 and/or step 306. A player may also select an option to cash out or otherwise terminate wagering game 400.

As described above, the portion or percentage of player wagers allocated to tiered plurality of progressive jackpots 402 may increase from one jackpot 406-412, or one tier of jackpot 406-412, to the next. For example, a first portion of player wagers may be allocated to first jackpot 406 when first jackpot 406 receives allocations, and a second, larger, portion of player wagers may be allocated to second jackpot 408 when second jackpot 408 receives allocations. Third jackpot 410 may likewise receive a larger, third portion, of player wagers, and fourth jackpot 412 may receive an even larger fourth portion of player wagers. Specifically, in the exemplary embodiment, first portion is in the range of 2-4% of player wagers, second portion is in the range of 3-6% of player wagers, third portion is in the range of 4-8% of player wagers, and fourth portion is in the range of 6-12% of player wagers.

Accordingly, tiered plurality of progressive jackpots 402 may not only be filled from a lowest paying jackpot 406 to a highest paying jackpot 412, as described above. In addition, a rate at which each jackpot 406-412 is filled may vary from one jackpot 406-412 to the next jackpot 406-412. For example, in at least one embodiment, each jackpot 406-412 is filled at a rate greater that the rate a preceding or lower paying jackpot 406-412 is filled. For example, first jackpot 406 may receive wager allocations at a rate of 2%, second jackpot 408 may receive wager allocations at a rate of 3%, third jackpot may receive wager allocations at a rate of 4%, and fourth jackpot may receive wager allocations at a rate of 6%. Thus, the portion or percentage of wagers allocated to a respective jackpot 406-412 may increase as jackpots 406-412 are filled from lowest to highest. As a result, from a player perspective, the rate of wager allocation (or jackpot increases) may appear to accelerate or speed up as jackpots 406-412 are filled.

Thus, an electronic gaming system for incrementing a tiered plurality of jackpots, from a lowest paying jackpot to a highest paying jackpot, is described. The electronic gaming system includes a progressive system server communicatively coupled, or networked, to a plurality of electronic gaming machines. Each time a player places a wager, such as by selecting a spin button, a plurality of reels may be spun, and a lowest paying uncapped jackpot in the tiered plurality of progressive jackpots may receive an incremental increase that corresponds to a portion or percentage of the player wager. In addition, the portion or percentage of each wager allocated to a jackpot may increase as jackpots are filled from the lowest paying to the highest paying jackpot. Specifically, a lowest paying jackpot may receive a smallest incremental increase, while a highest paying jackpot may receive a highest incremental increase. Thus, jackpots may incrementally fill from lowest to highest, and the rate of increase may accelerate as jackpots are filled.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

a plurality of electronic gaming machines comprising a plurality of display devices; and a progressive system server communicatively coupled to the plurality of electronic gaming machines, the progressive system server configured to:

establish a tiered plurality of progressive jackpots, the tiered plurality of progressive jackpots including a first jackpot that is increasable to a first cap value, a second jackpot that is increasable to a second cap value greater than the first cap value, and at least one intermediate jackpot that is increasable to at least one intermediate cap value greater than the first cap value and less than the second cap value;

cause display of first amounts associated with the tiered plurality of progressive jackpots at the plurality of display devices of the plurality of electronic gaming machines;

determine a lowest uncapped jackpot of the tiered plurality of progressive jackpots associated with a plurality of input allocation rules, whereby the input allocation rules include that:

the first jackpot is incrementally increased, if the first jackpot is below the first cap value and is the lowest uncapped jackpot, until the first jackpot reaches the first cap value, the at least one intermediate jackpot is incrementally increased, if the at least one intermediate jackpot is below the at least one intermediate cap value, the at least one intermediate jackpot is the lowest uncapped jackpot, and after the first jackpot reaches the first cap value, until the at least one intermediate jackpot reaches the at least one intermediate cap value, and the second jackpot is incrementally increased, if the second jackpot is below the second cap value, the second jackpot is the lowest uncapped jackpot, and after the at least one intermediate jackpot reaches the at least one intermediate cap value, until the second jackpot reaches the second cap value;

allocate, in response to inputs received by one or more of the electronic gaming machines and based upon the plurality of input allocation rules, portions of the inputs to one of i) the first jackpot, ii) the at least one intermediate jackpot, or iii) the second jackpot; and cause display of the first amounts being updated to second amounts associated with the tiered plurality of progressive jackpots at the plurality of display devices of the plurality of electronic gaming machines, wherein the second amounts comprise the first amounts adjusted based on the allocation.

2. The electronic gaming system of claim 1, wherein the progressive system server is further configured to:

i) allocate, based upon the input allocation rules, a first percentage of the inputs received only to the first jackpot if a value of the first jackpot is less than the first cap value;

ii) allocate, based upon the input allocation rules, a second percentage of the inputs received only to the at least one intermediate jackpot if the value of the first jackpot is equal to the first cap value and a value of the at least one intermediate jackpot is less than the at least one intermediate cap value, wherein the second percentage is greater than the first percentage; and iii) allocate, based upon the input allocation rules, a third percentage of the inputs received only to the second jackpot if the value of the first jackpot is equal to the first cap value, the value of the at least one intermediate jackpot is equal to the at least one intermediate cap value, and a value of the second jackpot is less than the second cap value, wherein the third percentage is greater than the second percentage.

3. The electronic gaming system of claim 1, wherein the progressive system server is further configured to:

award one of the first jackpot, the at least one intermediate jackpot, and the second jackpot to a player; and allocate portions of subsequent inputs received by the one or more of the electronic gaming machines only to the awarded jackpot if the awarded jackpot is the lowest uncapped jackpot and until the awarded jackpot returns to a cap value associated therewith.

4. The electronic gaming system of claim 1, wherein the progressive system server is further configured to sequentially add portions of inputs received by the one or more of the electronic gaming machines to one progressive jackpot of the tiered plurality of progressive jackpots to fill the progressive jackpot to its respective cap value, wherein the tiered plurality of progressive jackpots are filled, in order, from the first jackpot until the first cap value is reached to the second jackpot until the second cap value is reached, and wherein a progressive jackpot is not filled to a respective cap value until a progressive jackpot lower in the tiered plurality of progressive jackpots is filled to a respective cap value.

5. The electronic gaming system of claim 1, wherein the progressive system server is further configured to allocate the portions of the inputs received by the one or more of the electronic gaming machines to an escrow account if the value of the second jackpot is equal to the second cap value, whereby the escrow account is configured to store a value that is incremented in response to portions of inputs received when the values of each respective jackpot are equal to their respective cap values, and wherein a percentage allocated to the escrow account is less than a percentage allocated to at least one of the first jackpot, the second jackpot, or the intermediate jackpot.

6. The electronic gaming system of claim 5, wherein the progressive system server is further configured to:

award one of the first jackpot, the at least one intermediate jackpot, and the second jackpot to a player; and add, in response to awarding one of the first jackpot, the at least one intermediate jackpot, and the second jackpot, the value of the escrow account to the awarded jackpot.

7. The electronic gaming system of claim 1, wherein the progressive system server is further configured to determine, based upon the plurality of input allocation rules, the portions of the inputs allocated to one of the first jackpot, the at least one intermediate jackpot, the second jackpot, and an escrow account based upon at least one of i) a value of the input and ii) the jackpot in the tiered plurality of progressive jackpots receiving the input allocation if the jackpot receives the input allocation.

8. An electronic gaming system comprising:

a plurality of electronic gaming machines configured to present an electronic game, the plurality of electronic gaming machines comprising a plurality of display devices; and a progressive system server communicatively coupled to the plurality of electronic gaming machines, the progressive system server configured to:

establish a tiered plurality of progressive jackpots, each jackpot increasable to a respective cap value, the cap values increasing, in tiers, from a lowest cap value associated with a lowest paying jackpot in the tiered plurality of progressive jackpots to a highest cap value associated with a highest paying jackpot in the tiered plurality of progressive jackpots;

cause display of first amounts associated with the tiered plurality of progressive jackpots at the plurality of display devices of the plurality of electronic gaming machines;

determine a lowest uncapped jackpot of the tiered plurality of progressive jackpots;

add portions of inputs received by one or more of the electronic gaming machines to the lowest uncapped jackpot of the tiered plurality of progressive jackpots to fill the lowest uncapped jackpot to its respective cap value, wherein the tiered plurality of progressive jackpots are incrementally increased, in order, from the lowest paying jackpot until the lowest cap value is reached to the highest paying jackpot until the highest cap value is reached, and wherein a jackpot is not filled to a respective cap value until each lower paying jackpot of the tiered plurality of progressive jackpots is filled to a respective cap value; and cause display of the first amounts being updated to second amounts associated with the tiered plurality of progressive jackpots at the plurality of display devices of the plurality of electronic gaming machines, wherein the second amounts comprise the first amounts adjusted based on the added portions of the inputs.

9. The electronic gaming system of claim 8, wherein the one or more of the electronic gaming machines are configured to present a simulated plurality of rotating reels during the electronic game, each reel of the simulated plurality of rotating reels including a plurality of symbols, and wherein the progressive system server is further configured to award one jackpot of the tiered plurality of progressive jackpots to a player in response to a predefined symbol combination occurring on the simulated plurality of rotating reels during the electronic game.

10. The electronic gaming system of claim 8, wherein the progressive system server is further configured to:

award one jackpot of the tiered plurality of progressive jackpots to a player during the electronic game; and allocate portions of subsequent inputs received by the one or more of the electronic gaming machines to the awarded jackpot if the awarded jackpot is the lowest uncapped jackpot and until the awarded jackpot returns to a cap value associated therewith.

11. The electronic gaming system of claim 8, wherein the progressive system server is further configured to allocate portions of inputs received by the one or more of the electronic gaming machines to an escrow account if each progressive jackpot in the tiered plurality of progressive jackpots is filled to a respective cap value, whereby the escrow account is configured to store a value that is incremented in response to portions of inputs received when the values of each respective jackpot are equal to their respective cap values, and wherein a percentage allocated to the escrow account is less than a percentage allocated to at least one jackpot of the tiered plurality of progressive jackpots.

12. The electronic gaming system of claim 11, wherein the progressive system server is further configured to:

award one jackpot of the tiered plurality of progressive jackpots to a player; and add, in response to awarding the jackpot, the value of the escrow account to the awarded jackpot.

13. The electronic gaming system of claim 8, wherein the progressive system server is further configured to determine portions of inputs to allocate to one jackpot of the tiered plurality of progressive jackpots or an escrow account based upon values of the inputs.

14. The electronic gaming system of claim 8, wherein the progressive system server is further configured to allocate a smallest portion of an input received by the one or more of the electronic gaming machines to the lowest paying jackpot when the lowest paying jackpot receives the allocation, and wherein the progressive system server is further configured to allocate a largest portion of the input received by the one or more of the electronic gaming machines to the highest paying jackpot when the highest paying jackpot receives the allocation, whereby each progressive jackpot in the tiered plurality of progressive jackpots receives an allocation relative to, and based upon, a cap value associated therewith.

15. A method of establishing and maintaining a tiered plurality of progressive jackpots implemented by a progressive system server in communication with a plurality of electronic gaming devices, the plurality of electronic gaming devices comprising a plurality of display devices, the method comprising:

establishing, by the progressive system server, the tiered plurality of progressive jackpots, the tiered plurality of progressive jackpots including a first jackpot that is increasable a first cap value, a second jackpot that is increasable to a second cap value greater than the first cap value, and at least one intermediate jackpot that is increasable to at least one intermediate cap value greater than the first cap value and less than the second cap value;

causing display, by the progressive system server, of first amounts associated with the tiered plurality of progressive jackpots at the plurality of display devices of the plurality of electronic gaming devices;

determining a lowest uncapped jackpot of the tiered plurality of progressive jackpots, whereby:

the first jackpot is incrementally increased, if the first jackpot is below the first cap value and is the lowest uncapped jackpot, until the first jackpot reaches the first cap value, the at least one intermediate jackpot is incrementally increased, if the at least one intermediate jackpot is below the at least one intermediate cap value, the at least one intermediate jackpot is the lowest uncapped jackpot, and after the first jackpot reaches the first cap value, until the at least one intermediate jackpot reaches the at least one intermediate cap value, and the second jackpot is incrementally increased, if the second jackpot is below the second cap value, the second jackpot is the lowest uncapped jackpot, and after the at least one intermediate jackpot reaches the at least one intermediate cap value, until the second jackpot reaches the second cap value;

allocating, by the progressive system server and in response to inputs received by one or more of the electronic gaming devices, portions of the inputs to one of i) the first jackpot, ii) the at least one intermediate jackpot, and iii) the second jackpot; and causing display, by the progressive system server, of the first amounts being updated to second amounts associated with the tiered plurality of progressive jackpots at the plurality of display devices of the plurality of electronic gaming devices, wherein the second amounts comprise the first amounts adjusted based on the allocation.

16. The method of claim 15, further comprising:

i) allocating, by the progressive system server and based upon a plurality of input allocation rules, a first percentage of the inputs received only to the first jackpot if a value of the first jackpot is less than the first cap value;

ii) allocating, by the progressive system server and based upon the input allocation rules, a second percentage of the inputs received only to the at least one intermediate jackpot if the value of the first jackpot is equal to the first cap value and a value of the at least one intermediate jackpot is less than the at least one intermediate cap value, wherein the second percentage is greater than the first percentage; and iii) allocating, by the progressive system server and based upon the input allocation rules, a third percentage of the inputs received only to the second jackpot if the value of the first jackpot is equal to the first cap value, the value of the at least one intermediate jackpot is equal to the at least one intermediate cap value, and a value of the second jackpot is less than the second cap value, wherein the third percentage is greater than the second percentage.

17. The method of claim 15, further comprising:

awarding, by the progressive system server, one of the first jackpot, the at least one intermediate jackpot, and the second jackpot to a player; and allocating, by the progressive system server, portions of subsequent inputs received by the one or more of the electronic gaming devices only to the awarded jackpot if the awarded jackpot is the lowest uncapped jackpot and until the awarded jackpot returns to a cap value associated therewith.

18. The method of claim 15, further comprising:

sequentially adding, by the progressive system server, portions of inputs received by the one or more of the electronic gaming devices to one progressive jackpot of the tiered plurality of progressive jackpots to fill the progressive jackpot to its respective cap value, wherein the tiered plurality of progressive jackpots are filled, in order, from the first jackpot until the first cap value is reached to the second jackpot until the second cap value is reached, and wherein a progressive jackpot is not filled to a respective cap value until a progressive jackpot lower in the tiered plurality of progressive jackpots is filled to a respective cap value.

19. The method of claim 15, further comprising allocating, by the progressive system server, the portions of the inputs received by the one or more of the electronic gaming devices to an escrow account if the value of the second jackpot is equal to the second cap value, whereby the escrow account is configured to store a value that is incremented in response to portions of inputs received when the values of each respective jackpot are equal to their respective cap values and wherein a percentage allocated to the escrow account is less than a percentage allocated to at least one jackpot of the tiered plurality of progressive jackpots.

20. The method of claim 19, further comprising:

awarding, by the progressive system server, one jackpot of the tiered plurality of progressive jackpots to a player; and adding, in response to awarding the jackpot, the value of the escrow account to the awarded jackpot.

* * * * *